United States Patent
Ahmed

(10) Patent No.: US 11,539,257 B2
(45) Date of Patent: Dec. 27, 2022

(54) ELECTRIC MACHINE WITH ASYMMETRIC HAIRPIN CROWN

(71) Applicant: FORD GLOBAL TECHNOLOGIES, LLC, Dearborn, MI (US)

(72) Inventor: Adeeb Ahmed, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 189 days.

(21) Appl. No.: 17/131,503

(22) Filed: Dec. 22, 2020

(65) Prior Publication Data

US 2022/0200384 A1  Jun. 23, 2022

(51) Int. Cl.
- *H02K 3/28* (2006.01)
- *H02K 15/06* (2006.01)
- *H02K 1/16* (2006.01)
- *H02K 3/12* (2006.01)

(52) U.S. Cl.
CPC ............... *H02K 3/28* (2013.01); *H02K 1/16* (2013.01); *H02K 3/12* (2013.01); *H02K 15/064* (2013.01)

(58) Field of Classification Search
CPC ........... H02K 3/28; H02K 1/16; H02K 15/064
See application file for complete search history.

(56) References Cited

U.S. PATENT DOCUMENTS

| | | |
|---|---|---|
| 6,940,204 B2 | 9/2005 | Yamazaki et al. |
| 7,034,428 B2 | 4/2006 | Cai et al. |
| 7,622,843 B2 | 11/2009 | Cai |
| 9,819,238 B2 | 11/2017 | Ikura et al. |
| 10,707,713 B2 | 7/2020 | Liang et al. |
| 10,971,979 B2 * | 4/2021 | Miyazaki .................. H02K 3/12 |
| 11,063,488 B2 * | 7/2021 | Shin ......................... H02K 3/34 |
| 11,264,858 B2 * | 3/2022 | Dunn ...................... H02K 5/225 |
| 11,283,335 B2 * | 3/2022 | Ruggieri ............... H02K 15/064 |
| 11,356,004 B2 * | 6/2022 | Choi ......................... B21G 7/04 |
| 2016/0164359 A1 | 6/2016 | Han et al. |
| 2020/0395804 A1 | 12/2020 | Ahmed et al. |
| 2021/0218305 A1 * | 7/2021 | Tang ................... H02K 15/0421 |
| 2021/0399603 A1 * | 12/2021 | Kim .......................... H02K 3/50 |
| 2022/0006343 A1 * | 1/2022 | Schneider ............ H02K 15/064 |
| 2022/0190696 A1 * | 6/2022 | Jang ................... H02K 15/0428 |
| 2022/0200384 A1 * | 6/2022 | Ahmed ...................... H02K 1/16 |

FOREIGN PATENT DOCUMENTS

DE    10321956 B4    9/2013

* cited by examiner

*Primary Examiner* — Robert W Horn
(74) *Attorney, Agent, or Firm* — David B. Kelley; Brooks Kushman P.C.

(57) ABSTRACT

An electric machine is disclosed that includes a rotor, a stator and a plurality of pins. The stator is received inside the rotor and defines a plurality of slots for receiving the pins. The pins are conductors that are each joined with a circumferentially adjacent pins to form a conductive path for each power phase. The pins each have a first axial leg and a second axial leg that are each disposed in one of the plurality of slots. The first and second axial legs are joined by an asymmetric crown portion of the pin conductors. The crown portion includes a long arm and a short arm that are joined at an apex that is radially and circumferentially offset to be closer to the second leg than the first leg.

17 Claims, 5 Drawing Sheets

US 11,539,257 B2

ELECTRIC MACHINE WITH ASYMMETRIC HAIRPIN CROWN

TECHNICAL FIELD

This disclosure relates to conductors for electric machines that provide propulsion for electric vehicles.

BACKGROUND

Electric vehicles, for example hybrid vehicles, partial hybrid vehicles, plug-in vehicles and the like, may have an electric machine for propelling the vehicle and for storing energy from regenerative braking. The electric machine receives power from a high voltage traction battery that provides direct current (DC) to a variable voltage inverter that supplies multi-phase alternating current (AC) to the electric machine.

Electric machines are known that use shaped wire pins, also known as "hairpins" (hereinafter "pins") in place of windings on the stator of the electric machine. Pins are thin wire-like members that are received in receptacles, or axially extending slots, on the stator that are arranged in a nested circumferential array on the stator core. The pins have spaced legs that are welded together to create a conductor path. One path may be is provided for each phase of the alternating current. Two parallel conductor paths may be provided to increase the efficiency of the electric machine. The pins form a crown at one axial end of the stator. The crown end protrudes several millimeters out of the stator core.

Pin geometry is created by bending a metal rod or pin in a precise pattern to create separate conductor paths. The pins are coated with enamel that insulates the pin from adjacent pins that are not in the same conductor path.

The pins are inserted into axially extending slots in the stator core that are adapted to receive a plurality of pins (e.g. six or eight pins per slot). The pins are stacked in the slots from an inner diameter of the slot to the outer diameter of the slot and may be assigned numeric location identifiers (e.g. L1 being at the ID of each slot and L8 being at the OD of each slot with the intervening locations being identified as L2 to L7). The number of pins received in the slots may be a number other than eight.

In the locations in the slots adjacent to the ID and OD (e.g. L1 and L8 in an eight location slot) the pins are inserted in the slots at locations at the same radius from the central axis of the stator core. (L1 to L1 and L8 to L8). Symmetrical pins are normally bent to form an apex at the center of the crown that is formed by two equal arms that meet at the apex. Symmetrical pins that are inserted different ranks (e.g. L2 to L3; L4 to L5; L6 to L7) require only one sharp bend to avoid interference with adjacent pins because they do not return to the same radius ring. In a multi-phase electric machine, the pins from the other phases must be circumvented that are in intervening slots. Circumventing the intervening pins with a symmetrical pin in locations L1 and L8 necessitates sharply bending the pin adjacent one end of an arm of the pin that extends from a leg received in one of the slots to the apex. Symmetrical pins in L1 and L8 require sharper bends in the area of the crown to avoid interference with intervening pins. Bend sharpness is typically more severe compared to the intermediate pins (e.g. pins inserted between L2 to L3, L4 to L5) The sharper bends may create stress fractures in the enamel that may reduce the effectiveness of the enamel.

One previously proposed approach to reducing the need for a sharp bend is to increase the height of the crown in the locations adjacent the ID and OD of the stator core where the pins are inserted in the same radius slot locations. However, increasing the height of the crown suffers from the disadvantage of increasing the space requirements for the electric machine.

This disclosure is directed to solving the above problems and other problems as summarized below.

SUMMARY

According to one aspect of this disclosure, a pin conductor is disclosed for a stator of an electric machine. The pin conductor, or pin, comprises a wire segment having first and second connector portions, first and second axial legs, and a crown portion, wherein the crown portion has an apex, formed at the intersection of a short arm that extends from the apex to the first axial leg and a long arm that extends from the apex to the second axial leg.

According to another aspect of this disclosure, a stator is disclosed for an electric machine of an electric vehicle. The stator comprises a stator core defining a plurality of slots that are arrayed circumferentially around a central axis of the stator. A plurality of pins are joined together with adjacent pins in conductive paths for each AC power phase, wherein the pins have a first axial leg and a second axial leg that are received in two of the slots, wherein each of the first and second legs are joined together by a crown portion, the crown portion including a long arm and a short arm that are joined together at an apex that is radially and circumferentially offset to be closer to the second leg than the first leg.

According to yet another aspect of this disclosure, an electric machine having a plurality of AC power phases is disclosed that includes a rotor, a stator and a plurality of pins. The stator defines a plurality of slots that receive the pins. The pins are conductors that are each joined with a circumferentially adjacent pin conductor to form a conductive path for each power phase. The pin conductors each have a first axial leg and a second axial leg that are each disposed in one of the plurality of slots. The first and second axial legs are joined by a crown portion of the pin conductors. The crown portion includes a long arm and a short arm that are joined at an apex that is radially and circumferentially offset to be closer to the second leg than the first leg.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

Figure 1:
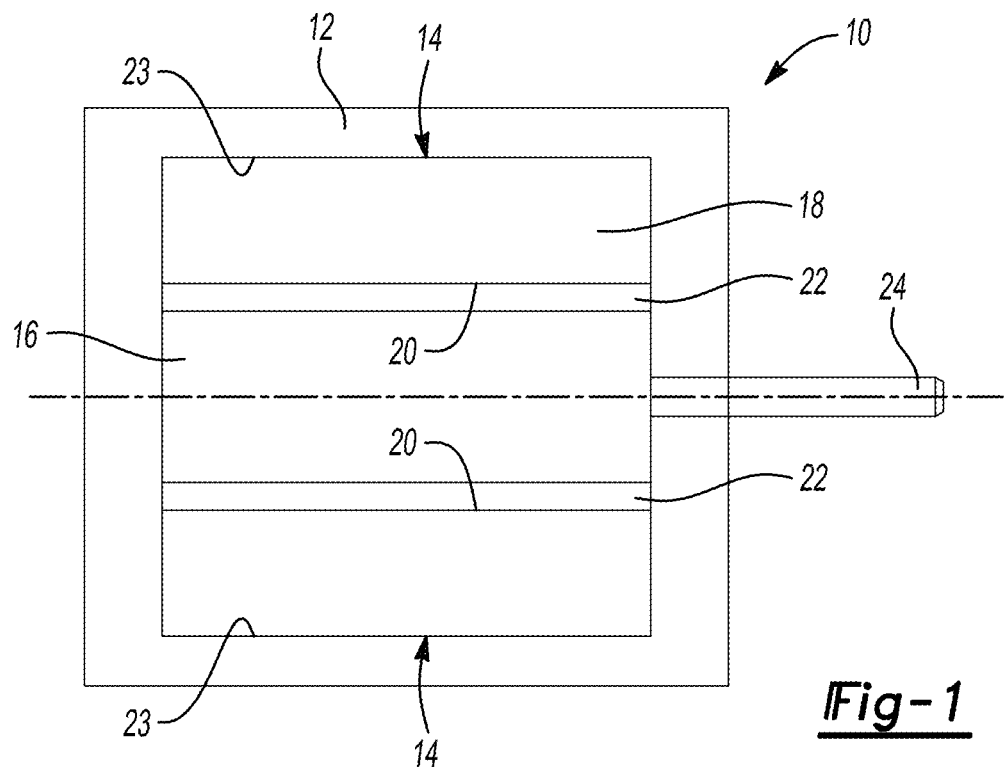
FIG. 1 is a schematic diagram of an electric machine for an electric vehicle.

FIG. 1 is a schematic diagram illustrating an example of an electric machine for an electric vehicle. The electric machine 10 is diagrammatically illustrated that may be used in a vehicle 10 such as a fully electric vehicle or a hybrid-electric vehicle. The electric machine 10 may be referred to as an electric motor, a traction motor, a generator, or the like. The electric machine 10 may be a permanent magnet machine, an induction machine, a synchronous machine, or the like. The electric machine 10 acts as both a motor to propel the vehicle and as a generator during regenerative braking.

The electric machine 10 may be powered by the traction battery (not shown) of the vehicle (not shown). The traction battery provides high-voltage direct current (DC) from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machine 10 and may provide the ability to bi-directionally transfer electrical energy between the traction battery and the electric machine 10. For example, a typical traction battery provides DC voltage while the electric machine 10 may require a multi-phase alternating current (AC) voltage. The power electronics module may include an inverter that converts the DC voltage to a multi-phase AC voltage as required by the electric machine 10. In a regenerative mode, the power electronics module may convert the multi-phase AC voltage from the electric machine 10 acting as a generator to the DC voltage required by the traction battery.

Figure 2:
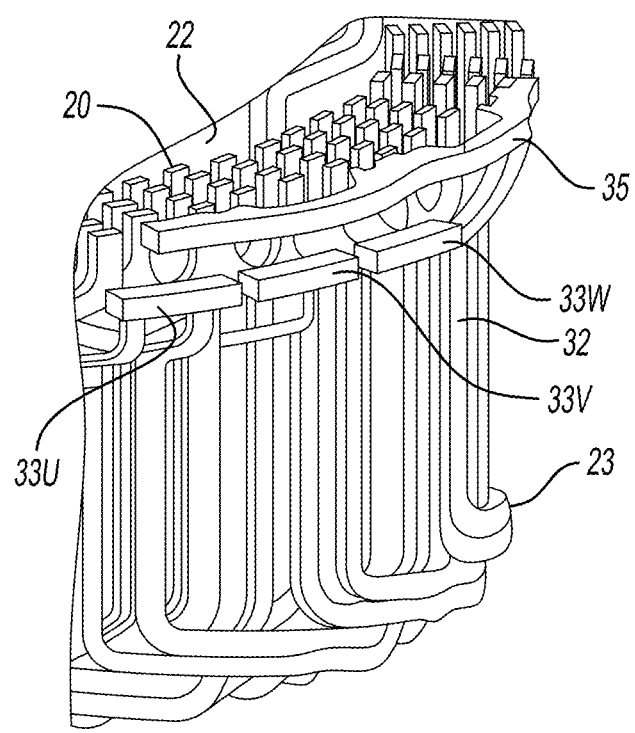
FIG. 2 is a perspective view of a ring of pins as assembled to the stator but with the body of the stator not shown.

Referring to FIGS. 1 and 2, the electric machine 12 includes a housing 12 that encloses a stator 14 and a rotor 16. The stator 14 is fixed to the housing 12 and includes a cylindrical stator core 18 having an inner diameter 20 that defines a hole 22 in which the rotor 16 is received and an outer diameter 23. The rotor 16 may include windings or permanent magnets that interact with conductor of the stator 14 to rotate the rotor 16 when the electric machine 12 is energized by the traction battery. The rotor 16 is supported on a driveshaft 24 that extends through the housing 12. The driveshaft 24 is configured to be coupled with a drivetrain of the vehicle.

The stator core 18 defines slots 26 (shown in FIGS. 10 and 11) circumferentially arranged around the core 18 that extend radially outward from the inner diameter 20. The slots 26 are equally spaced around the circumference of the stator core and extend axially from a first end 28, or crown end, of the core 18 to a second end 30, or connection end. In the illustrated embodiment, the core 18 defines thirty-six slots and has three poles (one for each phase), but the core 18 may include more or fewer slots and/or poles in other embodiments. For example, the core 18 may define forty-eight slots and have four poles.

The electric machine 10 includes pin conductors 32, or hairpins, assembled into the slots 26 of the core 18. Pin conductors 32 improve efficiency by providing a greater number of stator conductors that reduces the resistance of the conductor 32 without encroaching into the space required for the electrical steel and the magnetic flux path. The pin conductors 32 are wave conductors that weave pole to pole in a wave-like pattern.

For example, while the possible number of poles, slots per pole, and layers may vary, it is not practical in a pin conductor to have as many turns per coil as in a stranded winding. Each pin needs to be connected at the connection end 30 to the next pin by welding, soldering or the like, and needs to be bent according to a specific shape in order to make the connection possible. Another challenge is creating parallel circuits that are balanced (i.e., not causing large circulating currents in the loop formed by the parallel circuits due do dissymmetry) and have robust connections.

The electric machine 12 may be a three-phase machine in which the pin conductors 32 are arranged to have a U phase, a V phase, and a W phase. In one embodiment, each phase includes associated pins conductors 32 (also known as pins, pins, or bar conductors) arranged in a parallel path including two parallel conductive paths. In a three-phase system three of the parallel conductive paths are provided, one for each of the three phases. A set of three terminals 33 are shown in FIG. 2 with each of the three parallel conduction paths being connected to one of the terminals 33. A neutral terminal 35 is connected to all of the parallel conduction paths.

Figure 3:
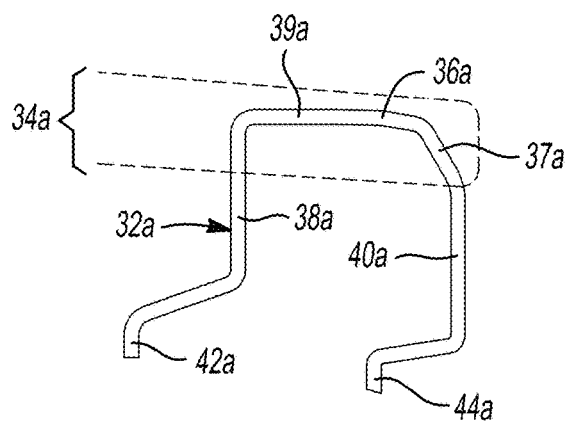
FIG. 3 is a perspective view of a 7-pitch outer diameter side pin.

Referring to FIG. 3, a seven-pitch pin conductor 32a for the outer diameter (OD) ring of the stator 14 is shown that includes a crown end portion 34a that has a maximum height (the height is measured from the crown end of the stator core) at a non-symmetrical peak 36a. The conductor 32a includes first and second axial legs 38a and 40a that extend linearly through the stator from the crown end 28 to the connection end 30. First and second connection segments 42a and 44a are provided at the connection end 30 and are configured to be welded to other pin conductors 32 arranged in a parallel conduction path (see FIG. 10). The conduction path extends from a terminal provided either on the ID or on the OD of the stator 14 to a neutral terminal provided either on the ID or on the OD of the stator 14.

The crown end portion 34a extends from the first axial leg 38a to the second axial leg 40a. A non-symmetrical peak 36a of the crown end portion 34a is offset to be spaced from the first axial leg 38a to a greater extent than the non-symmetrical peak 36a is spaced from the second axial leg 40. By offsetting the non-symmetrical peak 36a, the crown end portion 34a is reduced in height. The non-symmetrical peak 36a is formed at the intersection of a short arm 37a that extends from the non-symmetrical peak 36a to the first axial leg and a long arm 39a that extends from the non-symmetrical peak 36a to the second axial leg 39a.

Figure 4:
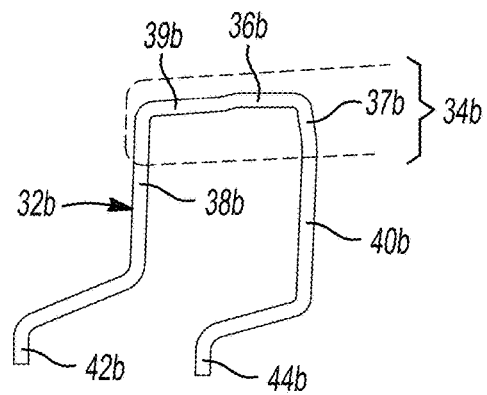
FIG. 4 is a perspective view of a 5-pitch outer diameter side pin.

Referring to FIG. 4, a five-pitch pin conductor 32b for the outer diameter (OD) ring of the stator 14 is shown that includes a crown end portion 34b that has a maximum height at a non-symmetrical peak 36b. The conductor 32b includes first and second axial legs 38b and 40b that extend linearly through the stator from the crown end 28b to the connection end 30b. First and second weld segments 42b and 44b are provided at the connection end 30b and are configured to be welded to other pin conductors 32b arranged in a conduction path (see FIG. 10) that extends from a terminal provided either on the ID or on the OD of the stator 14 to a neutral terminal provided either on the ID or on the OD of the stator 14.

The crown end portion 34b extends from the first axial leg 38b to the second axial leg 40b. The non-symmetrical peak 36b of the crown end portion 34b is offset to be spaced from the first axial leg 38b to a greater extent than the non-symmetrical peak 36b is spaced from the second axial leg 40. By offsetting the non-symmetrical peak 36b, the height of the crown end portion 34b is reduced in height. The non-symmetrical peak 36b is formed at the intersection of a short arm 37b that extends from the non-symmetrical peak 36b to the first axial leg and a long arm 39b that extends from the non-symmetrical peak 36b to the second axial leg 39b.

Figure 5:
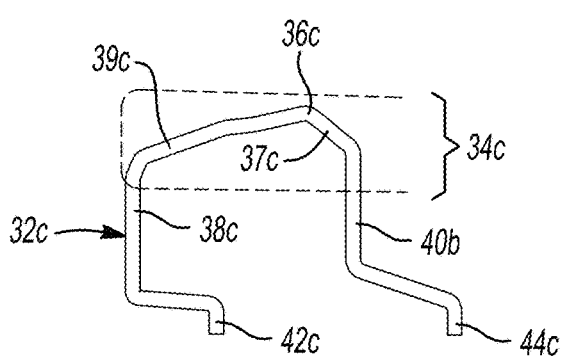
FIG. 5 is a perspective view of a 7-pitch inner diameter side pin.

Referring to FIG. 5, a seven-pitch pin conductor 32c for the ID ring of the stator 14 is shown that includes a crown end portion 34c that has a maximum height at a non-symmetrical peak 36c. The conductor 32c includes first and second axial legs 38c and 40c that extend linearly through the stator 14 from the crown end 28c to the connection end 30c. First and second weld segments 42c and 44c are provided at the connection end 30c and are configured to be welded to other pin conductors 32c arranged in a conduction path (see FIG. 10) that extends from a terminal provided either on the ID or on the OD of the stator 14 to a neutral terminal provided either on the ID or on the OD of the stator 14.

The crown end portion 34c extends from the first axial leg 38c to the second axial leg 40cc. The non-symmetrical peak 36c of the crown end portion 34c is offset to be spaced from the first axial leg 38c to a greater extent than the non-symmetrical peak 36c is spaced from the second axial leg 40. By offsetting the non-symmetrical peak 36c, the height of the crown end portion 34c is reduced in height. The non-symmetrical peak 36c is formed at the intersection of a short arm 37c that extends from the non-symmetrical peak 36c to the first axial leg and a long arm 39c that extends from the non-symmetrical peak 36c to the second axial leg 39c.

Figure 6:
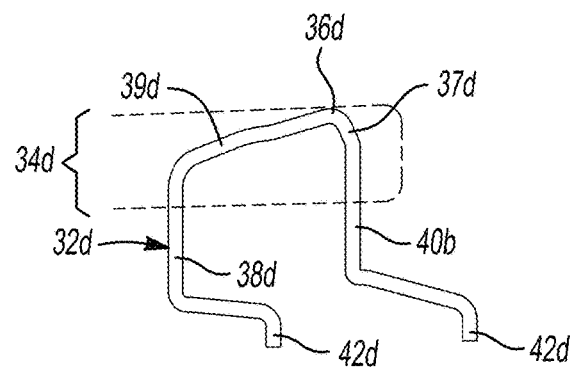
FIG. 6 is a perspective view of a 5-pitch outer diameter side pin.

Referring to FIG. 6, a five-pitch pin conductor 32d for the ID ring of the stator 14 is shown that includes a crown end portion 34d that has a maximum height at a non-symmetrical peak 36d. The conductor 32d includes first and second axial legs 38d and 40d that extend linearly through the stator 14 from the crown end 28 to the connection end 30. First and second weld segments 42d and 44d are provided at the connection end 30 and are configured to be welded to other pin conductors 32 arranged in a conduction path (see FIG. 10) that extends from a terminal provided either on the ID or on the OD of the stator 14 to a neutral terminal provided either on the ID or on the OD of the stator 14.

The crown end portion 34d extends from the first axial leg 38d to the second axial leg 40d. The non-symmetrical peak 36d of the crown end portion 34d is offset to be spaced from the first axial leg 38d to a greater extent than the non-symmetrical peak 36d is spaced from the second axial leg 40. By offsetting the non-symmetrical peak 36d, the height of the crown end portion 34d is reduced in height. The non-symmetrical peak 36d is formed at the intersection of a short arm 37d that extends from the non-symmetrical peak 36d to the first axial leg and a long arm 39d that extends from the non-symmetrical peak 36d to the second axial leg 39d.

Figure 7:
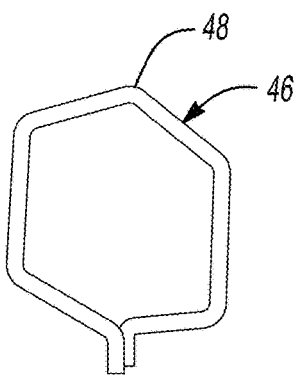
FIG. 7 is a perspective view of a 6-pitch middle pin.
Figure 8:
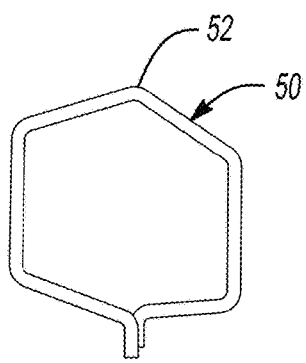
FIG. 8 is a perspective view of a 5-pitch middle pin.
Figure 9:
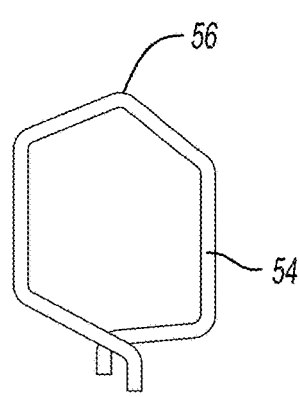
FIG. 9 is a perspective view of another 5-pitch middle pin.

FIGS. 7-9 illustrate conventional symmetrical middle pins 46 for the middle layers of the stator 14 that are inserted in other rings at different radial distances from the central axis of the stator (L1 to L2 or L5 to L6). The middle pins 46 do not face the same problem as the pins connected in the rings adjacent the ID and OD wherein both legs are inserted in the same ring because they don't interfere with the adjacent pins. The middle pin 46 shown in FIG. 7 is a six-pitch conductor that is inserted in two slots that are spaced apart by six slots. The middle pin may have a centered symmetrical peak 48. The middle pin 50 shown in FIG. 8 is a five-pitch conductor that may have a centered symmetrical peak 52. The middle pin 54 shown in FIG. 9 is a five-pitch conductor that has a centered symmetrical peak 56.

Figure 10:
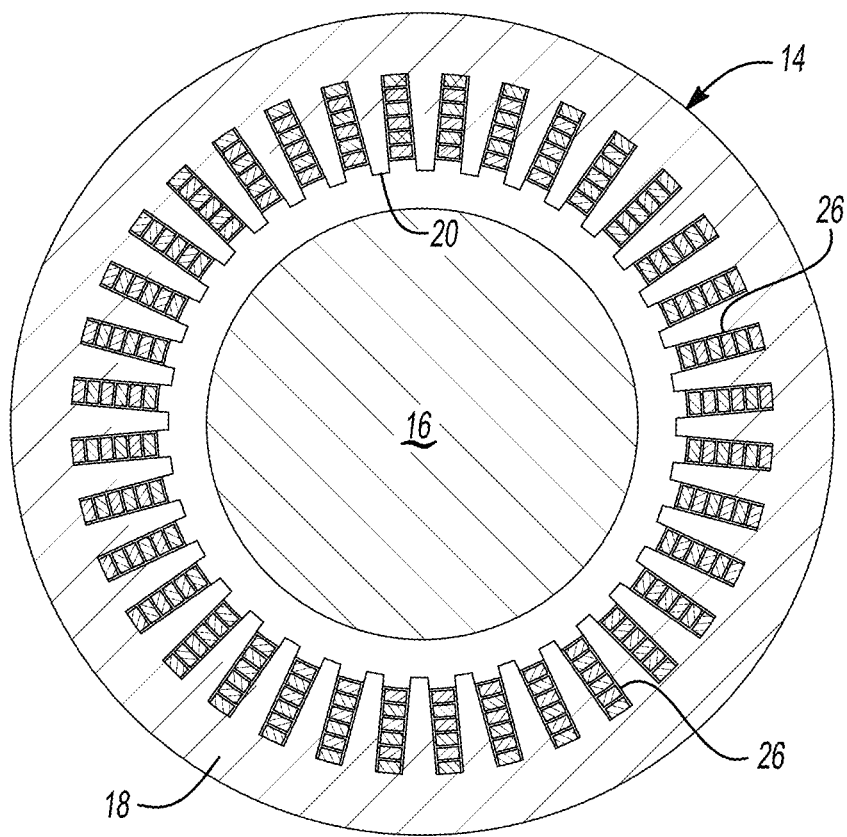
FIG. 10 is a radial cross-section of the stator with the pins installed in the radial slot locations.
Figure 11:
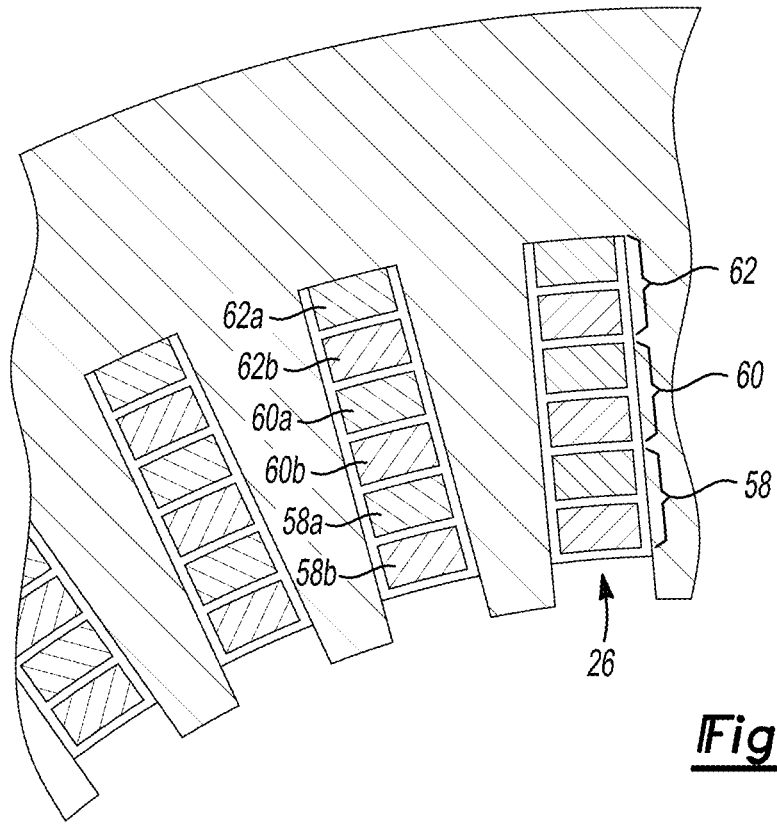
FIG. 11 is an enlarged view of a portion of the stator shown in FIG. 10.

FIGS. 10 and 11 illustrate in cross section the structure of the stator 14 with slots 46 that receive the first and second axial legs 38 and 40. The slots 46 are arranged 1 through 36 in the counterclockwise direction with only the odd number slots being labeled for convenience. The slots 46 may include an inner radial layer 58 of pins, a middle radial layer 60 of pins, and an outer radial layer 62 of pins. Each of the layers includes at least two radial positions that are adjacent to each other. In the illustrated embodiment, each slot 46 has six positions with the inner layer 58 including an inner position 58a and an outer position 58b; the middle layer 60 including an inner position 60a and an outer position 60b; and the outer layer 62 including an inner position 62a and outer position 62b. The positions extend radially outward with the inner position 58a being adjacent to the inner diameter 20 of the stator core 18 and the outer position 62b of the outer layer 62 being nearest to an outer diameter 23 of the core 18. The positions are sequential and in a one-by-six linear arrangement.

Figure 12:
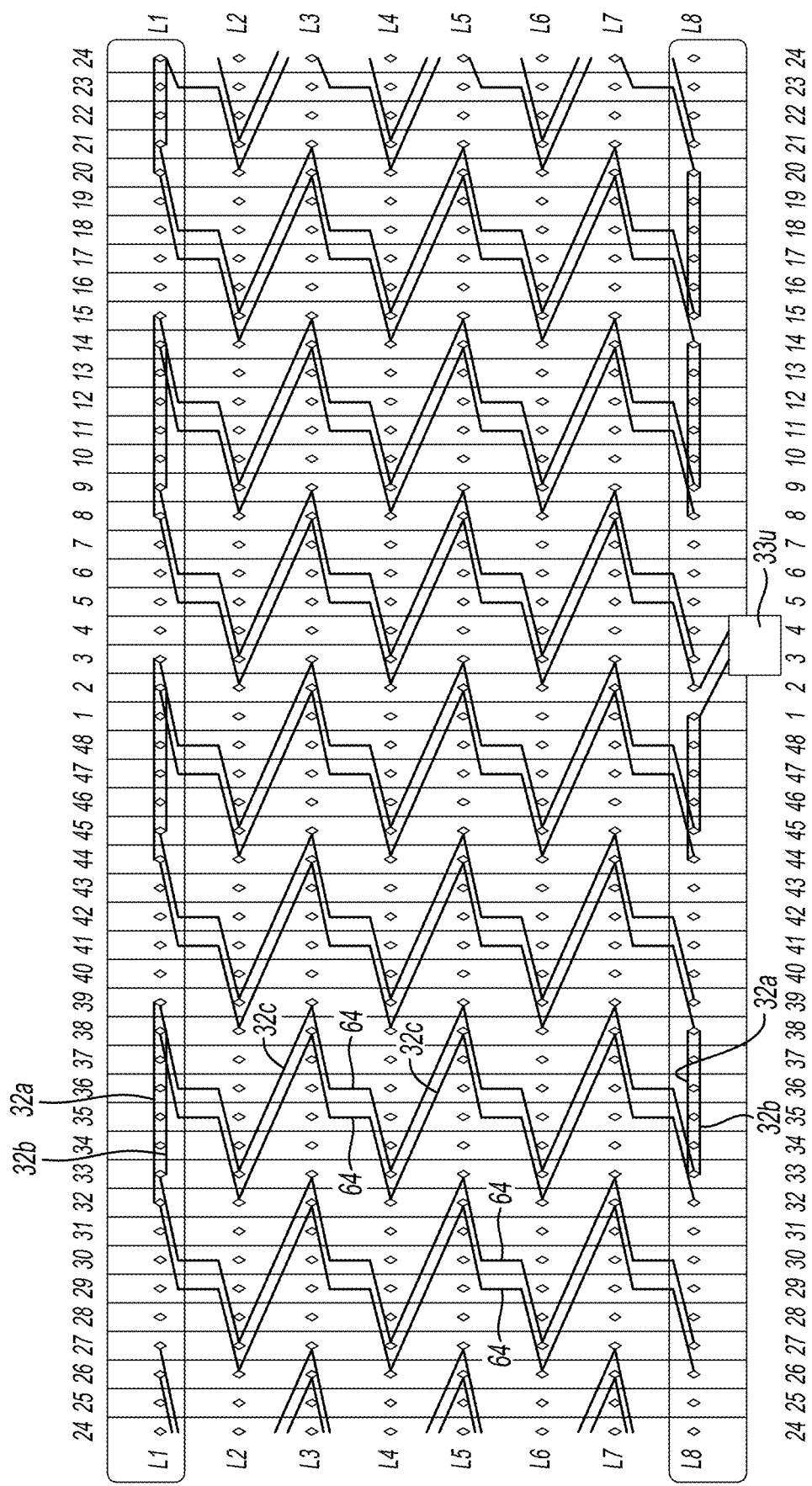
FIG. 12 is a pin insertion diagram showing how the pins assembled to the stator to form a dual path for one phase of the electric machine.

Referring to FIG. 12, a sample wiring diagram is provided for a single phase of the electric machine 10. The diagram identifies the levels of the slots 46 from L1 to L8 with L1 being the location closest to the ID and L8 being the location closest to the OD. The slots 46 are numbered from 1 to 48 and are arranged circumferentially around the stator 14. The pin conductors shown in FIGS. 3 and 4 are inserted into the location L8 and the pin conductors shown in FIGS. 5 and 6 are inserted into the location L1. The middle pin conductors shown in FIGS. 7-9 are inserted in the locations L2 to L7 and are inserted in adjacent radial layers (between L2 and L3; L4 and L5; etc.).

The pin conductors in FIGS. 3 and 4 are inserted in the L1 to reduce the height of the crown end. The pin conductors in FIGS. 5 and 6 are inserted in the L8 to also reduce the height of the crown end. The middle pin conductors 46, 50, and 54 shown in FIGS. 7-9 are used to jump between layers.

One portion of a conduction path is described beginning with a seven-pitch conductor at L1 slot 32-39. One of the middle pins jumps from L1 slot 38 to L2 slot 32. Another middle pin jumps from L1 slot 39 to L2 slot 33. Insertion of the middle pins 54 continues linking the middle pins in rows L1 to L8 with one leg of the middle pins in L1 or L8 and asymmetric pins with both legs in either rows L1 or L8.

Figure 13:
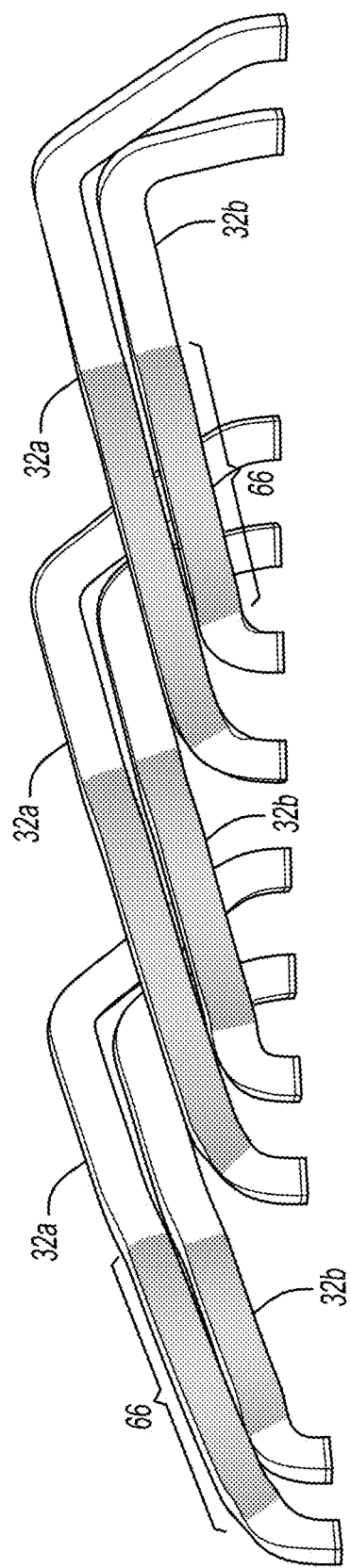
FIG. 13 is a diagrammatic view of several five pitch and seven pitch pins made according to this disclosure.

Referring to FIG. 13, several five pitch pins 32b and seven pitch pins 32a are shown with an area 66 being indicated by brackets to show where reduced bending is required compared to symmetric pins shown in FIGS. 7-9.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pin conductor for a stator of an electric machine comprising a wire segment having first and second connector portions, first and second axial legs, and a crown portion, wherein the crown portion has an apex, formed at an intersection of a short arm that extends from the apex to the first axial leg and a long arm that extends from the apex to the second axial leg.

2. The pin conductor of claim 1 wherein the first and second axial legs are spaced apart and are adapted to be received in slots formed in a stator core that are seven pitches apart.

3. The pin conductor of claim 1 wherein the first and second axial legs are spaced apart and are adapted to be received in slots formed in a stator core that are five pitches apart.

4. The pin conductor of claim 1 wherein the crown portion is disposed at a crown end of a stator core.

5. The pin conductor of claim 1 wherein the first and second connector portions are disposed at a connection end of a stator core.

6. A stator for an electric machine of an electric vehicle comprising:
a stator core defining a plurality of slots that are arrayed circumferentially around a central axis of the stator; and
a plurality of pins, wherein each of the pins are joined together with adjacent pins in conductive paths for each AC power phase, wherein the pins have a first axial leg and a second axial leg that are received in two of the slots, wherein each of the first axial leg and second axial leg are joined together by a crown portion, the crown portion including a long arm and a short arm that are joined together at an apex that is radially and circumferentially offset to be closer to the second axial leg than the axial first leg.

7. The stator of claim 6 wherein the plurality of pins includes middle pins having first and second middle pin axial legs that are joined together by equal length arms at a radially centered symmetrical apex.

8. The stator of claim 6 wherein the first and second axial legs are spaced apart and are adapted to be received in slots formed in the stator core that are seven pitches apart.

9. The stator of claim 6 wherein the first and second axial legs are spaced apart and are adapted to be received in slots formed in the stator core that are five pitches apart.

10. The stator of claim 6 wherein the crown portion is disposed at a crown end of the stator core.

11. The stator of claim 6 wherein a first connector portion and second connector portion are disposed at a connection end of the stator core.

12. An electric machine having a plurality of AC power phases comprising:
a rotor;
a stator defining a plurality of slots; and
a plurality of pins that are each joined together with a circumferentially adjacent pin to form a conductive path for each power phase, wherein the pins each have a first axial leg and a second axial leg that are each disposed in one of the plurality of slots, and wherein the first and second axial legs are joined by a crown portion of the pins, the crown portion includes a long arm and a short arm that are joined at an apex that is radially and circumferentially offset to be closer to the second axial leg than the first axial leg.

13. The stator of claim 12 wherein the plurality of pins includes middle pins having first and second middle pin axial legs that are joined by equal length arms at a radially centered symmetrical apex.

14. The electric machine of claim 12 wherein the first and second axial legs are spaced apart and are adapted to be received in slots formed in the stator that are seven pitches apart.

15. The electric machine of claim 12 wherein the first and second axial legs are spaced apart and are adapted to be received in slots formed in the stator that are five pitches apart.

16. The electric machine of claim 12 wherein the crown portion is disposed at a crown end of the stator.

17. The electric machine of claim 12 wherein a first connector portion and second connector portion are disposed at a connection end of the stator.

* * * * *